United States Patent [19]

Ando

[11] Patent Number: 5,254,619
[45] Date of Patent: Oct. 19, 1993

[54] CURABLE COMPOSITION

[75] Inventor: Naotami Ando, Hyogo, Japan

[73] Assignee: Kanegafuchi Kagaku Kogyo Kabushiki Kaisha, Osaka, Japan

[21] Appl. No.: 826,426

[22] Filed: Jan. 27, 1992

[30] Foreign Application Priority Data

Jan. 28, 1991 [JP] Japan ................... 3-8636

[51] Int. Cl.$^5$ ............................. C08L 51/00
[52] U.S. Cl. ................. 524/504; 524/506; 524/521; 525/64; 525/100; 525/72
[58] Field of Search ......... 525/63, 72, 64, 100; 524/504, 506, 521

[56] References Cited

U.S. PATENT DOCUMENTS

| | | | |
|---|---|---|---|
| 3,678,133 | 7/1972 | Ryan | 260/876 R |
| 3,880,796 | 4/1975 | Christenson et al. | 260/33.6 |
| 3,966,667 | 6/1976 | Sullivan et al. | 260/33.6 |
| 4,461,870 | 7/1984 | Kanda et al. | 525/123 |
| 4,468,493 | 8/1984 | Ishikura et al. | 525/123 |
| 4,518,726 | 5/1985 | Kato et al. | 524/32 |
| 4,530,946 | 7/1985 | Kanda et al. | 523/418 |
| 4,563,372 | 1/1986 | Kurauchi et al. | 427/409 |

FOREIGN PATENT DOCUMENTS 318880 6/1989 European Pat. Off. .
2435931 2/1975 Fed. Rep. of Germany .

*Primary Examiner*—Ralph H. Dean, Jr.
*Attorney, Agent, or Firm*—Varndell Legal Group

[57] ABSTRACT

The curable composition comprising (A) an alkoxysilyl group-containing acrylic copolymer or a mixture therof with a hydroxyl group-containing acrylic resin, (B) a curing catalyst, (C) an organic solvent and (D) fine particles of a cross-linked polymer which is insoluble but stably dispersible in the components (A), (B) and (C), the cross-linked polymer (D) comprising (d1) a backbone polymer polymerized from a monomer mixture having mainly an alkyl acrylate and (d2) a grafted phase polymerized in the presence of the backbone polymer (d1) from a monomer mixtuer having mainly an alkyl methacrylate. The composition of the present invention is improved in sag resistance as well as excellent in durability and film appearance, so a satisfactorily thick film can be obtained by one application of the composition.

7 Claims, No Drawings

CURABLE COMPOSITION

BACKGROUND OF THE INVENTION

The present invention relates to a curable composition, and more particularly to a curable composition suitable for use as a coating to various materials such as outer walls of buildings, automobiles, industrial equipments, steel furnitures, household electric appliances and plastics, especially as a coating for applications required to have excellent durability.

Top coatings applied to outer surface of buildings or building materials or automobiles, or maintenance coatings are required to have both an excellent durability and an excellent film appearance. As a means for improving the film appearance, a coating composition has been used as a high build coating. Conventional coating compositions are, however, poor in sag resistance (property capable of forming a thick film by one application without sagging), so a thickness of a coating film per one application is at most 30 μm. Accordingly, the application of the coating composition must be repeated twice or more in order to obtain a film thickness of 50 μm or more.

In order to improve the sag resistance of acrylic melamine coating compositions, Japanese Unexamined Patent Publication No. 2-4629, No. 58-129065 or No. 49-97026 has reported to add fine particles of a cross-linked polymer to the coating composition. According to these methods, though the sag resistance of the acrylic melamine coating composition can be improved, the obtained effect is insufficient, and as to alkoxysilyl group-containing acrylic copolymer coating compositions, the sag resistance is not improved.

Not only in order to economize in energy but also in order to nurse resources, it has been desired to form a thick film by one application of the coating composition. According to known techniques, the obtained film is unsatisfactorily thick, and a technique capable of forming thicker film is required.

An object of the present invention is to provide a curable composition having an improved sag resistance and capable of forming a thick film with an excellent appearance.

This and other objects of the present invention will become apparent from the description hereinafter.

SUMMARY OF THE INVENTION

It was already found that an alkoxysilyl group-containing acrylic copolymer or a mixture of an alkoxysilyl group-containing acrylic copolymer and a hydroxyl group-containing acrylic resin can provide a coating film which is excellent in durability, chemical resistance, appearance, solvent resistance, and the like. It has now been found that when fine particles of a specific cross-linked polymer prepared by conducting the polymerization in the presence of a polymer having a glass transition temperature of not more than 10° C. are added to the alkoxysilyl group-containing acrylic copolymer or the mixture, the sag resistance can be remarkably improved, which is unexpected according to the known methods.

In accordance with the present invention, there is provided a curable composition comprising (A) (a1) an alkoxysilyl group-containing acrylic copolymer having a group represented by the formula (I):

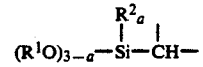

wherein
R$^1$ is an alkyl group having 1 to 10 carbon atoms,
R$^2$ is a hydrogen atom, or a monovalent hydrocarbon group having 1 to 10 carbon atoms selected from an alkyl group, an aryl group and an aralkyl group, and a is 0, 1 or 2, (B) a curing catalyst,
(C) an organic solvent, and
(D) a cross-linked polymer in the state of fine particles: the cross-linked polymer (D) comprising:

(d1) a backbone polymer polymerized from (i) a monomer mixture of (i1) at least 50 parts by weight of at least one alkyl acrylate, wherein the alkyl group has 2 to 8 carbon atoms, (i2) 0.005 to 5 parts by weight of a cross-linking monomer, (i3) 0 to 49.95 parts by weight of other (meth)acrylic monomer and (i4) 0 to 20 parts by weight of non-(meth)acrylic copolymerizable monomer, the amount of the monomer mixture (i) being 100 parts by weight, the backbone polymer (d1) having a glass transition temperature of not more than 10° C.; and (d2) a grafted phase polymerized in the presence of the backbone polymer (d1) from (ii) a monomer mixture of (ii1) at least 40 parts by weight of at least one alkyl methacrylate, wherein the alkyl group has 1 to 4 carbon atoms, (ii2) 0 to 60 parts by weight of other (meth)acrylic comonomer and (ii3) 0 to 60 parts by weight of non-(meth)acrylic copolymerizable comonomer, the amount of the monomer mixture (ii) being 100 parts by weight; the polymer (D) being insoluble but stably dispersible in the components (A), (B) and (C). The curable composition of the present invention can further contain (a3) a hydroxyl group-containing acrylic resin.

DETAILED DESCRIPTION

The composition of the present invention contains, as the component (A), (a1) an alkoxysilyl group-containing acrylic copolymer having a group represented by the formula (I):

or (a2) a mixture of the acrylic copolymer (a1) and (a3) a hydroxyl group-containing acrylic resin. Since the alkoxysilyl group-containing acrylic copolymer (a1) has the alkoxysilyl group represented by the formula (I), the hydrolysis reaction is caused due to moisture, then the silanol condensation reaction is caused to crosslink.

The alkoxysilyl group-containing acrylic copolymer has the group represented by the formula (I):

wherein R$^1$ is an alkyl group having 1 to 10, preferably from 1 to 4, carbon atoms, R$^2$ is a hydrogen atom or a monovalent hydrocarbon group having 1 to 10 carbon atoms selected from an alkyl group having, preferably from 1 to 4 carbon atoms, an aryl group and an aralkyl group, and a is 0, 1 or 2.

When the number of carbon atoms of the group $R^1$ is more than 10, the reactivity of the alkoxysilyl group (I) is lowered. Also, when the group $R^1$ is a group other than the alkyl group such as phenyl group or benzyl group, the reactivity is lowered. Examples of the groups $R^1$ are, for instance, methyl group, ethyl group, n-propyl group, iso-propyl group, n-butyl group, iso-butyl group, and the like. When more than one $R^1$ is present, the groups $R^1$ are the same or different.

Examples of the group $R^2$ are, for instance, alkyl groups such as methyl, ethyl, n-propyl, iso-propyl, n-butyl and iso-butyl, aryl groups such as phenyl and aralkyl groups such as benzyl. When more than one $R^2$ is present, the groups $R^2$ are the same or different.

Examples of the alkoxysilyl group represented by the formula (I) are, for instance, groups contained in alkoxysilyl group-containing monomers as mentioned below.

The alkoxysilyl group-containing acrylic copolymer (a1) has in one molecule at least one, preferably two or more alkoxysilyl groups represented by the formula (I). When the acrylic copolymer (a1) has less than one alkoxysilyl group in one molecule, the solvent resistance of the obtained film becomes poor. The acrylic copolymer (a1) may have the alkoxysilyl group at the polymer ends or side chains, or at both the polymer ends and the side chains.

Since the main chain of the acrylic copolymer (a1) substantially consists of an acrylic copolymer chain, the cured product therefrom is excellent in weatherability, chemical resistance, water resistance, and the like. Further, since the alkoxysilyl group is attached to the carbon atom, the cured product is more excellent in water resistance, alkali resistance, acid resistance, and the like.

It is preferable that the number average molecular weight of the acrylic copolymer (a1) is from 1,000 to 30,000, more preferably from 3,000 to 25,000, from the viewpoint of the film properties such as durability.

The alkoxysilyl group-containing acrylic copolymer (a1) can be prepared, for instance, by copolymerizing (1) acrylic or methacrylic acid or a derivative therefrom with (2) a monomer containing the alkoxysilyl group.

The monomers (1) are not particularly limited. Typical examples of the monomer (1) are, for instance, acrylic acid, methacrylic acid, methyl (meth)acrylate (acrylate or methacrylate, hereinafter the same), ethyl (meth)acrylate, butyl (meth)acrylate, 2-ethylhexyl (meth)acrylate, stearyl (meth)acrylate, benzyl (meth)acrylate, cyclohexyl (meth)acrylate, trifluoroethyl (meth)acrylate, pentafluoropropyl (meth)acrylate, perfluorocyclohexyl (meth)acrylate, acrylonitrile, methacrylonitrule, glycidyl (meth)acrylate, dimethylaminoethyl (meth)acrylate, diethylaminoethyl (meth)acrylate, acrylamide, methacrylamide, α-ethyl (meth)acrylamide (acrylamide or methacrylamide, hereinafter the same), N-butoxymethyl (meth)acrylamide, N,N-dimethyl acrylamide, N-methyl acrylamide, acryloyl morpholine, 2-hydroxyethyl (meth)acrylate, 2-hydroxypropyl (meth)acrylate, N-methylol (meth)acrylamide, "Aronix M-5700" (which is commercially available from Toagosei Chemical Industry Co., Ltd.), "AS-6", "AN-6", "AA-6", "AB-6", "AK-5", (which are macromers commercially available from Toagosei Chemical Industry Co., Ltd.), "Placcel FA-1", "Placcel FA-4", "Placcel FM-1", "Placcel FM-4", (which are commercially available from Daicel Chemical Industries, Ltd.), a phosphate group-containing vinyl compound which is a condensation product of a hydroxyalkyl ester of α,β-ethylenically unsaturated carboxylic acid such as a hydroxyalkyl ester of acrylic or methacrylic acid with phosphoric acid or a phosphoric ester, an acrylate or methacrylate containing an urethane bond or siloxane bond, and the like. When using the hydroxyl group-containing monomer as the derivative of acrylic or methacrylic acid (1), it is preferable that the hydroxyl group-containing monomer is used in a small amount such as not more than 5% by weight of the copolymer (a1).

The alkoxysilyl group-containing monomers (2) are not particularly limited so long as the monomer has a polymerizable double bond and the alkoxysilyl group. Typical examples of the alkoxysilyl group-containing monomers (2) are, for instance, alkoxysilyl group-containing vinyl monomers such as

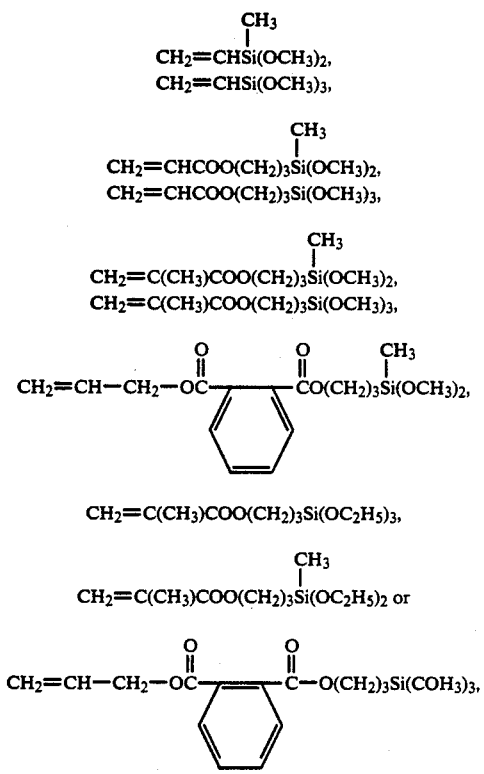

an acrylate or methacrylate having the alkoxysilyl group at the molecular ends through an urethane bond or a siloxane bond such as

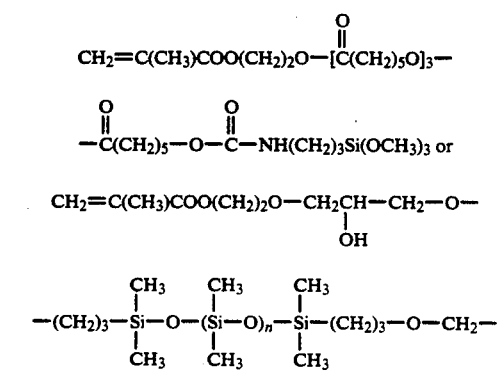

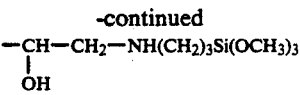

wherein n is 0 or an integer of 1 to 20, and the like. The alkoxysilyl group-containing monomer (2) may be used alone or as an admixture thereof.

It is preferable that the alkoxysilyl group-containing copolymer (a1) has 2 to 90% by weight, more preferably from 3 to 70% by weight, of units of the alkoxysilyl group-containing monomer (2), from the viewpoint of the curability of the composition and the durability of the film.

The alkoxysilyl group-containing acrylic copolymer (a1) may contain units of an urethane bond or siloxane bond, or units of monomers other than the acrylic or methacrylic acid or its derivative in its main chain within a range of less than 50% by weight of the copolymer (a1). The monomers other than acrylic or methacrylic monomers (3) are not particularly limited. Typical examples of the other monomers (3) are, for instance, an aromatic hydrocarbon vinyl compound such as styrene, α-methylstyrene, chlorostyrene, styrenesulfonic acid, 4-hydroxystyrene or vinyl toluene; an unsaturated carboxylic acid such as maleic acid, fumaric acid or itaconic acid, its salt (alkali metal salt, ammonium salt, amine salt), its anhydride (maleic anhydride), its ester including a diester or half ester of the above unsaturated carboxylic acid or anhydride with an alcohol with 1 to 20 carbon atoms having a linear or branched chain; a vinyl ester such as vinyl acetate or vinyl propionate; an allyl compound such as diallyl phthalate; an amino group-containing vinyl compound such as vinylpyridine, aminoethyl vinyl ether; an amide group-containing vinyl compound such as itaconic acid diamide, crotonamide, maleic acid diamide, fumaric acid diamide, N-vinylpyrrolidone; other vinyl compound such as 2-hydroxyethyl vinyl ether, methyl vinyl ether, cyclohexyl vinyl ether, vinyl chloride, vinylidene chloride, chloroprene, propylene, butadiene, isoprene, fluoroolefin, maleimide, N-vinylimidazole or vinylsulfonic acid; and the like.

The alkoxysilyl group-containing acrylic copolymer (a1) can be prepared, for instance, in a manner as described in Japanese Unexamined Patent Publication No. 36395/1979, and the like. Especially, solution polymerizations using an azo radical polymerization initiator such as azobisisobutyronitrile are most preferable.

If necessary, in the above solution polymerization, there may be used a chain transfer agent for controlling the molecular weight of the alkoxysilyl group-containing acrylic copolymer (a1). Examples of the chain transfer agents are, for instance, n-dodecyl mercaptan, t-dodecyl mercaptan, n-butyl mercaptan, γ-mercaptopropyltrimethoxysilane, γ-mercaptopropyl triethoxysilane, γ-mercaptopropylmethyldimethoxysilane, γ-mercaptopropylmethyldiethoxysilane, (CH$_3$O)$_3$Si-S-S-Si(OCH$_3$)$_3$, (CH$_3$O)$_3$Si-S$_3$-Si(OCH$_3$)$_3$, and the like. Particularly, when using the chain transfer agent having the alkoxysilyl group in its molecule, such as γ-mercaptopropyltrimethoxysilane, it is possible to introduce the alkoxysilyl group into the alkoxysilyl group-containing acrylic copolymer (a1) at the polymer ends.

Non-reactive solvents are used in the above-mentioned solution polymerization without particular limitations. Examples of the non-reactive solvents are, for instance, hydrocarbons such as toluene, xylene, n-hexane and cyclohexane, acetic esters such as ethyl acetate and butyl acetate, alcohols such as methanol, ethanol, isopropanol and n-butanol, ethers such as ethyl cellosolve, butyl cellosolve and cellosolve acetate, ketones such as methyl ethyl ketone, ethyl acetoacetate, acetylacetone, diacetone alcohol, methyl isobutyl ketone and acetone, and the like.

The alkoxysilyl group-containing acrylic copolymer (a1) may be used alone or as an admixture thereof.

In the present invention, there can be used an acrylic resin containing hydroxyl group and containing no alkoxysilyl group (a3) [arylic resin containing hydroxyl group other than the alkoxysilyl group-containing acrylic copolymer (a1)] together with the alkoxysilyl group-containing acrylic copolymer (a1) as the component (A), for improving film properties such as hardness and solvent resistance immediately after sintering. Since the main chain of the hydroxyl group-containing acrylic resin (a3) substantially consists of an acrylic copolymer chain, the cured product is excellent in weatherability, chemical resistance and water resistance.

The molecular weight of the hydroxyl group-containing acrylic resin (a3) is not particularly limited, and hydroxyl group-containing acrylic resins usually used can be used as the resin (a3) in the present invention. It is preferable that the number average molecular weight of the acrylic resin (a3) is from 1,500 to 40,000, more preferably from 3,000 to 25,000, from the viewpoint of the properties of the film (the coating film prepared from the composition of the invention) such as durability. Also, there are preferable hydroxyl group-containing acrylic resin wherein the number of hydroxyl groups is enough to cross-link. It is preferable that the hydroxyl value of the acrylic resin (a3) is from 10 to 300 mg/KOH, more preferably from 30 to 150 mg/KOH, from the viewpoint of the film properties such as strength and durability. The hydroxyl group-containing acrylic resin (a3) can be prepared, for instance, by copolymerizing a hydroxyl group-containing vinyl monomer (4) with an acrylic or methacrylic acid or a derivative therefrom (5).

The hydroxyl group-containing vinyl monomer (4) used in the present invention is not particularly limited. Typical examples of the hydroxyl group-containing vinyl monomers (4) are, for instance, e.g., 2-hydroxyethyl (meth)acrylate, 2-hydroxypropyl (meth)acrylate, 2-hydroxyethyl vinyl ether, N-methylol (meth)acrylamide, "Aronix 5700", 4-hydroxyl styrene, "HE-10", "HE-20", "HP-10" and "HP-20" (which are acrylate oligomers having hydroxyl group at the oligomer end, commercially available from Nippon Shokubai Kagaku Kogyo Kabushiki Kaisha), "Blenmer PP series (polypropylene glycol methacrylate)" commercially available from Nippon Yushi Kabushiki Kaisha, "Blenmer PE serives (polyethylene glycol monomethacrylate)", "Blenmer PEP serives (polyethylene glycol polypropylene glycol methacrylate)", "Blenmer AP-400 (polypropylene glycol monoacrylate)", "Blenmer AE-350 (polyethylene glycol monoacrylate)", "Blenmer NKH-5050 (polypropylene glycol polytrimethylenemonoacrylate)", "Blenmer GLM (glycerol monomethacrylate)", a hydroxyalkyl vinyl monomer modified with ε-caprolactone, obtained by the reaction of a hydroxyl group-containing vinyl compound with ε-caprolactone, and the like. Examples of the hydroxyalkyl vinyl monomers modified with ε-caprolactone are, for instance, monomers represented by the formula (II):

wherein R is H or CH$_3$ and n is an integer of not less than one such as "Placcel FA-1" (a vinyl monomer (II) wherein R is H and n is 1) commercially available from Daicel Chemical Industries, Ltd., "Placcel FA-4" (a vinyl monomer (II) wherein R is H and n is 4), "Placcel FM-1" (a vinyl monomer (II) wherein R is CH$_3$ and n is 1), "Placcel FM-4" (a vinyl monomer (II) wherein R is CH$_3$ and n is 4), "TONE M-100" (a vinyl monomer (II) wherein R is H and n is 2) commercially available from UCC Kabushiki Kaisha, "TONE M-201 (a vinyl monomer (II) wherein R is CH$_3$ and n is 1), and the like. When the hydroxyalkyl vinyl monomer modified with $\epsilon$-caprolactone is used as the hydroxyl group-containing vinyl monomer (4), the impact resistance and the flexibility of the coating film can be improved.

The hydroxyl group-containing vinyl monomer (4) may be used alone or as an admixture thereof.

The monomers (5) are not particularly limited. Typical examples of the monomers (5) are, for instance, acrylic acid, methacrylic acid, methyl (meth)acrylate, ethyl (meth)acrylate, butyl (meth)acrylate, 2-ethylhexyl (meth)acrylate, stearyl (meth)acrylate, benzyl (meth)acrylate, cyclohexyl (meth)acrylate, trifluoroethyl (meth)acrylate, pentafluoropropyl (meth)acrylate, perfluorocyclohexyl (meth)acrylate, acrylonitrile, methacrylonitrule, glycidyl (meth)acrylate, dimethylaminoethyl (meth)acrylate, diethylaminoethyl (meth)acrylate, acrylamide, methacrylamide, α-ethyl (meth)acrylamide, N-butoxymethyl (meth)acrylamide, N,N-dimethyl acrylamide, N-methyl acrylaimde, acryloyl morpholine, N-methylol (meth)acrylamide, "AS-6", "AN-6", "AA-6", "AB-6", "AK-5", (which are macromers, commercially available from Toagosei Chemical Industry Co., Ltd.), a phosphate group-containing vinyl compound which is prepared by the condensation of a hydroxyalkyl ester of α,β-ethylenically unsaturated carboxylic acid such as a hydroxyalkyl ester of acrylic or methacrylic acid with phosphoric acid or a phosphoric ester, an acrylate or methacrylate containing an urethane bond or siloxane bond, and the like.

The hydroxyl group-containing acrylic resin (a3) may contain an urethane bond or siloxane bond, or units of monomers other than acrylic or methacrylic acid or its derivatives in its main chain within a range of less than 50% by weight of the hydroxyl group-containing acrylic resin (a3). The monomers other than the acrylic or methacrylic monomer are not particularly limited. Typical examples of the monomers are, for instance, an aromatic hydrocarbon vinyl compound such as styrene, α-methylstyrene, chlorostyrene, styrenesulfonic acid or vinyl toluene; an unsaturated carboxylic acid such as maleic acid, fumaric acid or itaconic acid, its salt (alkali metal salt, ammonium salt, amine salt), its anhydride (maleic anhydride), its ester including a diester or half ester of the above unsaturated carboxylic acid or anhydride with an alcohol with 1 to 20 carbon atoms having a linear or branched chain; a vinyl ester such as vinyl acetate or vinyl propionate; an allyl compound such as diallyl phthalate; an amino group-containing vinyl compound such as vinylpyridine, aminoethyl vinyl ether; an amide group-containing vinyl compound such as itaconic acid diamide, crotonamide, maleic acid diamide, fumaric acid diamide, N-vinylpyrrolidone; other vinyl compound such as methyl vinyl ether, cyclohexyl vinyl ether, vinyl chloride, vinylidene chloride, chloroprene, propylene, butadiene, isoprene, fluoroolefin, maleimide, N-vinylimidazole or vinylsulfonic acid; and the like.

It is preferable that the hydroxyl group-containing acrylic resin (a3) is obtained by solution polymerization using an azo radical polymerization initiator such as azobisisobutyronitrile, since the resin (a3) can be easily obtained according to the above-mentioned method.

In such a solution polymerization, if necessary, a chain transfer agent such as n-dodecyl mercaptane, t-dodecyl mercaptane or n-butyl mercaptane is used, thereby controlling the molecular weight of the resin (a3). Non-reactive solvents are used without particular limitations as the solvent.

In the present invention, a dispersion containing no water wherein particles of the hydroxyl group-containing acrylic resin (a3) which is insoluble in a non-polar organic solvent such as heptane or pentane are dispersed in the organic solvent can be used as the component (a3).

The hydroxyl group-containing acrylic resin (a3) may be used alone or as a mixture thereof.

When the mixture (a2) of the alkoxysilyl group-containing acrylic copolymer (a1) and the hydroxyl group-containing acrylic resin (a3) is used as the component (A) of the curable composition of the present invention, the weight ratio of the alkoxysilyl group-containing acrylic copolymer (a1) to the hydroxyl group-containing acrylic resin (a3) is not particularly limited. It is preferable that the weight ratio of the copolymer (a1) to the resin (a3) is from 9/1 to 1/9, more preferably from 8/2 to 2/8. When the weight ratio of (a1)/(a3) is more than 9/1, the film is poor in water resistance. On the other hand, when the weigh ratio of (a1)/(a3) is less than 1/9, the effects obtained by the addition of the acrylic resin (a3) are unsatisfactorily exhibited.

Examples of the curing catalyst (B) used in the present invention are, for instance, an organotin compound, a phosphoric acid or phosphoric ester including an acid phosphate, an addition reaction product of an epoxy compound with phosphoric acid and(or) an acid phosphate, an organic titanate compound, an organic aluminum compound, an organic zirconium compund, an acidic compound including a saturated or unsaturated polyvalent carboxylic acid or its anhydride, amines, a reaction product or a mixture of the amine as mentioned above with the acid phosphate, an alkaline compund, a reactive silicon compound, and the like.

Concrete examples of the organotin compounds are, for instance, dibutyl tin dilaurate, dibutly tin dimaleate, dioctyl tin dilaurate, dioctyl tin dimaleate or its polymer, tin octoate, and the like. Concrete examples of the phosphate are, for instance, monomethyl phosphate, monoethyl phosphate, monobutyl phosphate, monooctyl phosphate, monodecyl phosphate, dimethyl phosphate, diethyl phosphate, dibutyl phosphate, dioctyl phosphate, didecyl phosphate, and the like. As to the addition reaction product of the phosphoric acid and(or) monomeric acid phosphate with the epoxy compound, concrete examples of the epoxy compound are, for instance, propylene oxide, butylene oxide, cyclohexene oxide, glycidyl methacrylate, glycidol, allyl glycidyl ether, γ-glycidoxypropyltrimethoxysilane, γ- glycidoxypropyltriethoxysilane, γ-glycidoxypropylmethyldimethoxysilane,

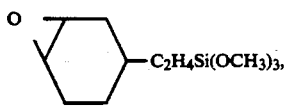

"Cardula E" (commercially available from Yuka Schell Epoxy Kabushiki Kaisha), "Epicote 828" (commercially available from Yuka Shell Epoxy Kabushiki Kaisha) or "Epicote 1001", and the like. Concrete examples of the organic aluminum compound are, for instance, tris(ethylacetoacetate)aluminum, tris(acetylacetonate)aluminum, and the like. Concrete examples of the organic zirconium compound are, for instance, tetrabutyl zirconate, tetrakis(acetylacetonato)zirconium, tetraisobutyl zirconate, butoxytris(acetylacetonato)zirconium, and the like. Concrete examples of the acidic compound are, for instance, maleic acid, adipic acid, azelaic acid, sebacic acid, itaconic acid, citric acid, succinic acid, phthalic acid, trimellitic acid, pyromellitic acid, p-toluenesulfonic acid, and the like. Concrete examples of the amines are, for instance, hyxylamine, di-2-ethylhexylamine, N,N-dimethyldodecylamine, dodecylamine, and the like. Concrete examples of the alkaline compound are, for instance, sodium hydroxyide, potassium hydroxyde, and the like.

Among these curing catalysts (B), there are preferable the organotin compound, the acid phosphate, the reaction product or the mixture of the acid phosphate and the amine, the saturated or unsaturated polyvalent carboxylic acid or its anhydride, the reactive silicon compound, the organic titanate compound, the organic aluminum compound, the organic zirconium compound, and a mixture thereof, since these compounds have high activity.

The curing catalyst (B) may be used alone or as a mixture thereof.

The amount of the curing catalyst (B) is not particularly limited. The amount is usually from 0.1 to 20 parts by weight, preferably from 0.1 to 10 parts by weight, based on 100 parts by weight of the component (A) (solid matter). When the amount of the curing catalyst (B) is less than 0.1 part by weight, the curability tends to lower. On the other hand, when the amount of the component (B) is more than 20 parts by weight, the appearance of the film tends to bad.

The composition of the invention includes the solvent (C). Any non-reactive solvent can be used. Examples of the solvent are, for instance, aliphatic hydrocarbons, aromatic hydrocarbons, halogenated hydrocarbons, alcohols, ketones, esters, ethers, alcoholic esters, ketone alcohols, ether alcohols, ketone ethers, ketone ester, ester ethers, and the like. Among them, it is preferable to use alkyl alcohols and hydrolyzable ester compounds having dehydrating property as the solvent (C) since the storage stability can be improved.

Alkyl alcohols having an alkyl group with 1 to 10 carbon atoms are preferable as the alkyl alcohol as mentioned above. Examples of the preferable alcohols are, for instance, methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, octyl alcohol, cellosolve, and the like.

The amount of the solvent such as the alkyl alcohol is not particularly limited. The amount of the solvent (C) varies depending on the molecular weight or the composition of the component (A), and it is adjusted according to a necessary solid content or viscosity of the coating composition for practical application. Usually, the amount of the solvent is not more than 100 parts by weight, preferably from 0.5 to 50 parts by weight, based on 100 parts by weight of the component (A) (solid matter).

When using the combination of the alcohol, particularly the alkyl alcohol with the dehydrating agent, the storage stability of the mixture comprising the components (A) and (B) can be remarkably improved.

Examples of the dehydrating agents are, for instance, hydrolyzable ester compounds such as methyl orthoformate, ethyl orthoformate, methyl orthoacetate, ethyl orthoacetate, methyltrimethoxysilane, γ-methacryloyloxypropyltrimethoxylsilane, vinyltrimethoxysilane, methyl silicate and ethyl silicate, and the like.

The amount of the dehydrating agent is not particularly limited. The amount is usually not more than 100 parts by weight, preferably not more than 50 parts by weight, based on 100 parts by weight of the component (A) (solid matter).

The curable composition of the present invention contains as the component (D) the fine particles of the specific cross-linked polymer which are insoluble in each of the components (A), (B) and (C), and are stably dispersible in the mixture of the components (A), (B) and (C). Since the fine particles of the cross-linked polymer (D) are insoluble in the component (A), (B) or (C), and stably dispersible in the mixture of the components (A), (B) and (C), it gives the thixotropic property to the curable composition. The phrase of "stably dispersible" used herein means that the fine particles of the cross-linked polymer can get in the state that they do not cohere together with each other after the addition of the fine particles until the coating film is cured.

As the fine particles of cross-linked polymer (D), fine particles disclosed in U.S. Pat. No. 3,678,133 can be used. That is, the cross-linked polymer is prepared by first polymerizing a first monomer mixture (i) of (i1) least 50 parts by weight of at least one alkyl acrylate having $C_2$ to $C_8$ alkyl group, (i2) 0.05 to 5 parts by weight of the cross-linking monomer, (i3) 0 to 49.95 parts by weight of the other (meth)acrylic monomer and (i4) 0 to 20 parts by weight of the other non-(meth)acrylic copolymerizable monomer, the amount of the monomer mixture (i) being 100 parts by weight, to give (d1) a polymer (backbone polymer) having a glass transition temperature (Tg) of 10° C. or less, subsequently polymerizing in the presence of the backbone polymer (d1) a second monomer mixture (ii) of (ii1) at least 40 parts by weight of at least one alkyl methacrylate having $C_1$ to $C_4$ alkyl group, (ii2) 0 to 60 parts by weight of the other (meth)acrylic comonomer and (ii3) 0 to 60 parts by weight of the other non-(meth)acrylic copolymerizable comonomer, the amount of the monomer mixture (ii) being 100 parts by weight.

It is preferable that the cross-linked polymer contains from 10 to 90% by weight, preferably from 25 to 75% by weight (solid matter) of the backbone polymer (d1). Also, it is preferable that the backbone (d2) is in the state of an aqueous dispersion during preparation of the cross-linked polymer.

It is preferable that the average particle size of the cross-linked polymer fine particles (D) is from 0.01 to 10 μm, more preferably from 0.02 to 5 μm. When the average particle size is less than 0.01 μm or more than 10 μm, the obtained curable composition is poor in sag resistance. The average particle size of the cross-linked polymer fine particles (D) such as not more than 10 μm is a particle size which do not interfere with the formation of the film. If desirable, the particle size can be easily made small by mechanical means.

As the cross-linked polymer fine particles (D), there can be used the fine particles prepared by emulsion polymerization, or by NAD method wherein the copolymerization is conducted in a non-aqueous organic solvent capable of solving an aliphatic hydrocarbon monomer but imcapable of solving its polymer in the presence of a stabilizing agent, and the like. Among them, the fine particles obtained by emulsion polymerization are preferable, because it can easily provide films whose gloss is less lowered. According to the NAD method, it is required that the composition of the monomer mixture (ii) to be formed into the grafted phase (d2) is arranged to a composition showing a solubility parameter close to the solubility parameter of the non-aqueous organic solvent and the composition of the monomer mixture (i) to be formed into the backbone polymer (d1) is arranged to a composition showing a solubility parameter remarkably distinct from the solubility parameter of the non-aqueous organic solvent. Accordingly, the obtained cross-linked polymer is restricted in composition, according to the NAD method, so the fine particles obtained by emulsion polymerization are preferable.

In the preparation of the fine particles of the cross-linked polymer(D), the alkyl acrylate (i1) from which the backbone polymer (d1) is polymerized is an alkyl acrylate wherein alkyl group is a linear or branched alkyl group having 2 to 8 carbon atoms. When the number of carbon atoms of the alkyl group is 1 or not less than 9, the glass transition temperature is too high, which is not preferable. Examples of the alkyl acrylate (i1) are, for instance, ethyl acrylate, propyl acrylate, n-butyl acrylate, isobutyl acrylate, hexyl acrylate, n-octyl acrylate, 2-ethylhexyl acrylate, and the like. The monomer (i1) may be used alone or as an admixture thereof.

The amount of the alkyl acrylate is 50 parts by weight or more, preferably 70 parts by weight or more based on 100 parts by weight of the monomer mixture (i).

As the cross-linking monomer (i2), there are exemplified monomers having at least two radical-polymerizable ethylenically unsaturated groups, and the like. Examples of the cross-linking monomer (i2) are, for instance, a mono- or polyethylene glycol diacrylate such as ethylene glycol diacrylate, diethylene glycol diacrylate, triethylene glycol diacrylate or tetraethylene glycol diacrylate; a mono- or polyethylene glycol dimethacrylate such as ethylene glycol dimethacrylate, diethylene glycol dimethacrylate, triethylene glycol dimethacrylate or tetraethylene glycol dimethacrylate; divinyl benzene; an allyl compound, e.g., a mono-, di or triallyl compound such as diallyl phtharate, diallyl sebacate, triallyl triazin, allyl methacrylate or allyl acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-trishydroxymethylethane di(meth)acrylate, 1,1,1-trishydroxymethylethane tri(meth)acrylate, 1,1,1-trishydroxymethylpropane di(meth)acrylate, 1,1,1-trishydroxymethylpropane tri(meth)acrylate, triallylcyanurate, triallyl isocyanurate, triallyl trimellitate, diallyl terephtharate, and the like. The cross-linking monomer (i2) may be used alone or as a mixture thereof. In order to obtain the good compatibility of the backbone polymer (d2) with the monomer mixture (ii) by increasing the swell degree of the ingredients in the monomer mixture (ii) on the graft-polymerization, it is preferable to use the dimethacrylates of mono- or polyethylene glycol or diacrylates of mono- or polyethylene glycol. The cross-linking monomer (i2) is used in an amount of 0.05 to 5 parts by weight based on 100 parts by weight of the monomer mixture (i). When the amount of the cross-linking monomer (i2) is more than 5 parts by weight, the impact resistance is not improved and the sag resistance is poor. The alkyl acrylate (i1) is increased in gel content by copolymerizing the cross-linking monomer (i2) to decrease the swell degree in the organic solvent.

As the other (meth)acrylic monomer (i3) in the monomer mixture (i), there are examplified, for instance, methyl acrylate, an alkyl acrylate wherein the alkyl group has 9 or more carbon atoms, an aromatic acrylate such as phenyl acrylate or benzyl acrylate, a methacrylic ester such as methyl methacrylate, ethyl methacrylate, butyl methacrylate or benzyl methacrylate, an unsaturated nitrile such as acrylonitrile or methacrylonitrile, 2-ethylhexyl methacrylate, stearyl (meth)acrylate (acrylate and methacrylate collectively referred to as "(meth)acrylate"), cyclohexyl (meth)acrylate, trifluoroethyl (meth)acrylate, pentafluoropropyl (meth)acrylate, perfluorocyclohexyl (meth)acrylate, glycidyl (meth)acrylate, dimethylaminoethyl (meth)acrylate, diethylaminoethyl (meth)acrylate, acrylamide, methacrylamide, α-ethyl (meth)acrylamide, N-butoxymethyl (meth)acrylamide, N,N-dimethyl acrylamide, N-methyl acrylamide, acryloyl morpholine, 2-hydroxyethyl (meth)acrylate, 2-hydroxypropyl (meth)acrylate, 2-hydroxypropyl (meth)acrylate, N-methylol (meth)acrylamide, "Aronix M-5700", "AS-6", "AN-6", "AA-6", "AB-6", "AK-5", "Placcel FA-1", "Placcel FA-4", "Placcel FM-1", "Placcel FM-4", a phosphate group-containing vinyl monomer such as a condensation product of a hydroxyalkyl ester of α,β-ethylenically unsaturated carboxylic acid, e.g., acrylic acid or methacrylic acid with phosphoric acid or its ester, an acrylate or methacrylate containing an urethane bond or siloxane bond, and the like. The term "(meth)acrylic monomer collectively refers to the above-described monomers derived from acrylic acid or methacrylic acid. It is not preferable to use diene compounds, because the double bond is introduced into the main chain of the cross-linked polymer, thus the weatherbility is lowered.

The other (meth)acrylic monomer (i3) is selected so as to get the backbone polymer (d1) having a Tg of not more than 10° C., preferably not more than −10° C.

The amount of the other (meth)acrylic monomer (i3) is from 0 to 49.95 parts by weight based on 100 parts by weight of the monomer mixture (i).

Examples of the other non-(meth)acrylic copolymerizable monomer (i4) (where "non-(meth)acrylic monomers copolymerizable monomers" refers to monomers other than monomers derived from acrylic acid or methacrylic acid) in the monomer mixture (i) are, for instance, an aromatic vinyl compound or its derivatives such as styrene, vinyl toluene, α-methylstyrene, chlorostyrene, bromostyrene or vinyl carbazole, a vinyl ether such as methyl vinyl ether, butyl vinyl ether, octyl vinyl ether, or stearyl vinyl ether, a vinyl ester such as vinyl formate, vinyl acetate, vinyl propionate or vinyl stearate; a vinyl halide such as vinyl chloride or vinyl bromide, a vinylidene halide such as vinylidene chloride, vinylidene bromide or vinylidene fluoride, an aromatic hydrocarbon vinyl compound such as styrenesulfonic acid, 4-hydroxystyrene or vinyl toluene, an unsaturated carboxylic acid such as maleic acid, fumaric acid or itaconic acid, its salt (alkali metal salt, ammonium salt, amine salt), its anhydride (maleic anhydride), an ester, e.g., a diester or half ester of the above unsaturated carboxylic acid or anhydride with an alcohol with 1 to 20 carbon atoms having a linear or branched chain; an amino group-containing vinyl compound such as vinylpyridine or aminoethyl vinyl ether; an amide group-containing vinyl compound such as itaconic acid diamide, crotonamide, maleic acid diamide, fumaric acid diamide or N-vinylpyrrolidone; an other vinyl compound such as 2-hydroxyethyl vinyl ether, cyclohexyl vinyl ether, chloroprene, propylene, isoprene, fluoroolefins, maleimide, N-vinylimidazole or vinylsulfonic acid; and the like. It is not preferable to use the conjugated dienes, because if the double bond is introduced into the main chain of the cross-linked polymer, whereby the weatherability is lowered.

The copolymerizable monomer (i4) is selected so as to get the backbone polymer having a Tg of not more than 10° C., preferably not more than −10° C.

The amount of the copolymerizable monomer (i4) is 0 to 20 parts by weight based on 100 parts by weight of the monomer mixture (i).

In order to obtain an aqueous dispersion of the backbone polymer (d1), usual emulsion polymerization manner is prefered. As an emulsifier, there can be used usual anionic surfactants, cationic surfactants, nonionic surfactants, and the like. As an polymerization initiator, there can be used known water-soluble peroxides, redox initiators, and the like. Further, chain transfer agents or builders may be added to the polymerization system as occasion demands. The polymerization temperature can be selected from the usual emulsion polymerization temperature condition, generally from 20° to 95° C., preferably from 30° to 70° C. When the polymerization temperature is so high, the molecular weight is lowered to decrease the gel content. The polymerization can proceed at a constant temperature, and the polymerication temperature can be elevated or dropped by stages during polymerization. The whole amount of the alkyl acrylate (i1) and the components (i2) to (i4) can be supplied at once at the initial stage or the whole amount or a part of the mixture (i) can be supplied continuously or intermittently to the polymerization system. Since the control of the polymerization temperature remarkably influences on the quality of the composition, the continuous or intermittent addition is preferable.

The Tg of the backbone polymer (d1) is not more than 10° C., preferably not more than −10° C.

The cross linked polymer used in the present invention is prepared by polymerizing in the presence of the obtained backbone polymer (d1) a monomer mixture (ii) of (ii1) at least 40 parts by weight, preferably at least 60 parts by weight, of at least one alkyl methacrylate wherein the alkyl group has 1 to 4 carbon atoms, (ii2) 0 to 60 parts by weight of, preferably from 0 to 50 parts by weight, of other (meth)acrylic comonomer, and (ii3) 0 to 60 parts by weight, preferably from 0 to 50 parts by weight, of non-(meth)acrylic copolymerizable comonomer, the amount of the monomer mixture (ii) being 100 parts by weight.

The Tg of the grafted phase (d2) is preferably not less than 20° C.

The weight ratio of the backbone polymer (d1) to the grafted phase (d2) is not particularly restricted. When the weight ratio of the backbone (d1) is so high, the backbone (d1) cannot be covered with the grafted phase (d2), thus resulting in that the cohesion of the fine particles easily occurs or the surface of the coating film is ununiform. Accordingly, it is preferable that the cross-linked polymer (D) has from 10 to 95% by weight, more preferably from 25 to 75% by weight, of the backbone polymer (d1).

The number of carbon atoms of the alkyl group of the alkyl methacrylate (ii1) is from 1 to 4, and both the linear alkyl group and the branched alkyl group can be used. Methyl methacrylate is a typical example of the alkyl methacrylate (ii1) and there are exemplified, in addition, ethyl methacrylate, propyl methacrylate, isopropyl methacrylate, n-butyl methacrylate, isobutyl methacrylate, t-tubyl methacrylate, and the like. The alkyl methacrylate (ii1) may be used alone or as a mixture thereof.

The amount of the alkyl methacrylate (ii1) is 40 parts by weight or more, preferably 60 parts by weight or more based on 100 parts by weight of the monomer mixture (ii).

The other (meth)acrylic comonomer (ii2) is acrylic or methacrylic ester other than the alkyl methacrylate having $C_1$ to $C_4$ alkyl group. Examples of the other (meth)acrylic comonomers (ii2) are, for instance, methyl acrylate, ethyl acrylate, butyl acrylate, 2-ethylhexyl (meth)acrylate, stearyl (meth)acrylate, benzyl (meth)acrylate, cyclohexyl (meth)acrylate, trifluoroethyl (meth)acrylate, pentafluoropropyl (meth)acrylate, perfluorocyclohexyl (meth)acrylate, glycidyl (meth)acrylate, dimethylaminoethyl (meth)acrylate, diethylaminoethyl (meth)acrylate, 2-hydroxyethyl (meth)acrylate, 2-hydroxypropyl (meth)acrylate, "Aronix M5700", "AS-6", "AN-6", "AA-6", "AB-6", "AK-5", "Placcel FA-1", "Placcel FA-4", "Placcel FM-1", "Placcel FM-4", a phosphate group-containing vinyl compound such as a condensation product of a hydroxyalkyl ester of $\alpha,\beta$-ethylenically unsaturated carboxylic acid such as acrylic or methacrylic acid with phosphoric acid or ester, an acrylate or methacrylate containing an urethane bond or siloxane bond, and the like.

The amount of the other (meth)acrylic comonomer (ii2) is from 0 to 60 parts by weight, preferably 0 to 50 parts by weight based on 100 parts by weight of the monomer mixture (ii).

Examples of the non-(meth)acrylic copolymerizable comonomers (ii3) are, for instance, an aromatic hydrocarbon vinyl compound such as (meth)acrylamide, $\alpha$-ethyl (meth)acrylamide, N-butoxymethyl (meth)acrylamide, N,N-dimethyl acrylamide, N-methyl acrylamide, acryloyl morpholine, N-methylol (meth)acrylamide, acrylonitrile, methacrylonitrile, (meth)acrylic acid, styrene, $\alpha$-methyl styrene, chlorostyrene, styrenesulfonic acid, 4-hydroxyl styrene or vinyl toluene; an unsaturated carboxylic acid such as maleic acid, fumaric acid or itaconic acid, its salt (alkali metal salt, ammonium salt, amine salt), its anhydride (maleic anhydride), an ester of unsaturated carboxylic acid, e.g., a diester or half ester of the above unsaturated carboxylic acid or anhydride with an alcohol with 1 to 20 carbon atoms having a linear or branched chain; a vinyl ester such as vinyl acetate or vinyl propionate; an amino group-containing vinyl compound such as vinylpyridine, aminoethyl vinyl ether; an amide group-containing vinyl compound such as itaconic acid diamide, crotonamide, maleic acid diamide, fumaric acid diamide or N-vinylpyrrolidone; other vinyl compound such as 2-hydroxyethyl vinyl ether, methyl vinyl ether, cyclohexyl vinyl ether, vinyl chloride, vinylidene chloride, chloroprrene, propylene, butadiene, isoprene, fluoroolefins, maleimide, N-vinylimidazole or vinylsulfonic acid; and the like.

The amount of the non-(meth)acrylic copolymerizable comonomer (ii3) is 0 to 60 parts by weight, preferably 0 to 50 parts by weight based on 100 parts by weight of the monomer mixture (ii).

The whole amount of the monomer mixture (ii) can be added at once, or the whole amount or its part can be added continuosly or intermittently, thereby proceeding the graft-polymerization. Further, the composition of the monomer mixture (ii) is kept constant during graft-polymerization, or can be altered within the range such that the properties of the obtained curable composition are not lowered.

The cross-linked polymer (D) is prepared by first preparing the backbone polymer (d1) on an initial stage and subsequently preparing the grafted part (d2) on a second stage in the same reactor. The backbone polymer (d1) is once prepared, then the graft-polymerization is conducted in a separate reactor. It is preferable that the backbone polymer (d1) is used in the state of an aqueous dispersion. In the graft-polymerization, there can be used or not a polymerization initiator, an emulsifier, or a chain transfer agent, and the like. As the initiators, emulsifiers and agents, the same those as used in the preparation of the backbone polymer (d1) are exemplified. If using the initiator, emulsifier or agent, the same kind agents as or different kind agents from that used in the preparation of backbone polymer (d1) can be used. The graft-polymerization conditions such as temperature are the same as or different from those adopted in the preparation of the backbone polymer (d1). The graft-polymerization conditions can be kept constant or altered during polymerization.

From the thus obtained aqueous dispersion of the cross-linked polymer, the fine particles are recovered by spray-drying, or by salting-out to coagurate, filtering, washing with water and drying.

The amount of the fine particles of the cross-linked polymer (D) is not particularly limited. The amount is, generally from 0.01 to 40 parts by weight, based on 100 parts by weight of the component (A) (solid matter), preferably from 0.1 to 20 parts by weight. When the amountis is less than 0.01 part by weight, the sag resistance is poor. When the amount is more than 40 parts by weight, the surface appearance of the coating film becomes bad because of the poor smoothness.

The curable composition of the present invention may contain a pigment. Examples of the pigments are, for instance, inorganic pigments such as titanium dioxide, ultramarine blue, iron blue, zinc yellow, red iron oxide, chrome yellow, white lead, carbon black, transparent iron oxide and aluminum powder, organic pigments such as azo pigments, triphenylmethane pigments, quinoline pigments, anthraquinone pigments and phthalocyanine pigments, and the like.

In the composition of the present invention, there can be added according to the uses thereof various additives such as diluents, ultraviolet absorbers, agents for preventing precipitation and leveling agents; celluloses such as nitrocellulose and cellulose acetate butyrate, resins such as epoxy resins, melamine resins, vinyl chloride resins, chlorinated propylene resins, chlorinated rubbers and polyvinyl butyral, fillers, and the like.

The curable composition of the present invention is applied to a substrate in a usual manner such as dipping, spraying or brushing, then the coating film is cured at room temperature to 180° C. in case where the composition contains no hydroxyl group-containing acrylic resin(a3), or at not less than 30° C., preferably from 55° to 350° C. in case where the composition contains the hydroxyl group-containing acrylic resin (a3).

Since the curable resin is excellent in sag resistance, a thick film having a thickness of a coating film per one application of 50 μm or more can be obtained, and the surface appearance of the film is excellent.

The present invention is more specifically described and explained by means of the following Examples in which all % and part are by weight unless otherwise noted. It is to be understood that the present invention is not limited to the Examples and various changes and modifications may be made in the present invention without departing form the spirit and scope thereof.

REFERENCE EXAMPLE 1

Preparation of an alkoxysilyl group-containing acrylic copolymer

A reactor equipped with a stirrer, a thermometer, a condenser, a nitrogen inlet tube and a dropping funnel was charged with 45.9 parts of xylene, and the reactor was heated to 110° C., introducing nitrogen gas thereto. A mixture (A-1) or (A-2) as shown in Table 1 was added dropwise to the reactor at a uniform velocity through the dropping funnel for 5 hours.

After completing the addition of the mixture (A-1) or (A-2), 0.5 part of 2,2'-azobisisobutyronitrile and 5 parts of toluene were added dropwise to the reactor at a uniform velocity for 1 hour. After completing the addition, the resulting mixture was aged at 110° C. for 2 hours, then it was cooled down and it was diluted with xylene to give a resin solution (A-1) or (A-2) having a solid concentration of 60%. The molecular weight of the resin are shown in Table 1.

TABLE 1

|  | Mixture No. | |
|---|---|---|
|  | A-1 (part) | A-2 (part) |
| Styrene | 12.8 | 0 |
| Methyl methacrylate | 50.1 | 48 |
| Stearyl methacrylate | 6.9 | 0 |
| γ-Methacryloyloxypropyltrimethoxysilane | 30.2 | 12 |
| n-Butyl acrylate | 0 | 39 |
| 2,2'-Azobisisobutyronitrile | 4.5 | 1.0 |
| Acrylamide | 0 | 1.0 |
| Xylene | 13.5 | 13.5 |
| Number average molecular weight | 6000 | 15000 |
| Resin solution No. | A-1 | A-2 |

REFERENCE EXAMPLE 2

Preparation of a hydroxyl group-containing acrylic resin

The same type reactor used as in Reference Example 1 was charged with 31.3 parts of butyl acetate and 9.5 parts of xylene and the reactor was heated to 110° C., introducing nitrogen gas thereto. A mixture (A-3) as shown in Table 2 was added to the reactor for 5 hours in the same manner as in Reference Example 1.

TABLE 2

|  | Mixture No. A-3 |
| --- | --- |
| Xylene | 18 parts |
| Styrene | 28.3 parts |
| Methyl methacrylate | 7.4 parts |
| n-Butyl acrylate | 32.5 parts |
| Placcel FM-1* | 31.8 parts |
| 2,2'-Azobisisobutyronitile | 4.5 parts |

(*addition reaction product of 2-hydroxyethylmethacrylate and ε-caprolactone, molar ratio = 1:1)

After completing the addition of the mixture (A-3), 0.2 part of 2,2-azobisisobutyronitrile and 3.8 parts of toluene were added dropwise to the reactor for 1 hour. After completing the addition, the mixture was reacted at 110° C. for 2 hours, then the resulting mixture was cooled down, and it was diluted with xylene to give a resin solution (A-3) having a solid concentration of 60% [hydroxyl value: 72 mgKOH/g.solid; $\overline{M}n$ (number average molecular weight): 6,000].

REFERENCE EXAMPLE 3

Preparation of fine particles of cross-linked polymer

Preparation of backbone polymer

A glass reactor equipped with a stirrer, a thermometer, a condenser and a nitrogen inlet tube was charged with a mixture (d-1), (d-2), (d-3) or (d-4) as shown in Table 3.

TABLE 3

|  | Backbone polymer | | | |
| --- | --- | --- | --- | --- |
|  | d-1 (part) | d-2 (part) | d-3 (part) | d-4 (part) |
| Deionized water | 200 | 200 | 200 | 200 |
| Butyl acrylate | 100 | 85 | 65 | 40 |
| Triethylene glycol dimethacrylate | 1 | 1 | 1 | 1 |
| Sodium dodecyl-benzenesulfonate | 0.2 | 0.2 | 0.2 | 0.2 |
| Potassium peroxodisulfate | 0.05 | 0.05 | 0.05 | 0.05 |
| Methyl methacrylate | — | 15 | — | 60 |
| 2-Ethylhexyl acrylate | — | — | 35 | — |

The reaction system was heated under nitrogen atmosphere with stirring to elevate the temperature to 55° C. After 45 minutes, the temperature further rose to more than 55° C., so while maintaining the reaction temperature at 55° C. by cooling, the reaction was conducted over 8 hours to give a backbone polymer. The yields of the backbone polymers (d-1) to (d-4) are 98%, respectively. Also, the particle sizes of the backbone polymers (d-1) to (d-4) were 0.15 μm, respectively. The particle size was culcurated from the obtained aqueous dispersion having a cloudiness of 546 μm.

After the aqueous dispersion was salted out and coagulated with calcium chloride, the coagulated particles were washed with water and methanol, and the particles were dried with a vacuum drier.

The swell degree and the gel content of the backbone polymer were measured as follows:

The dried polymer is collected with a 100-mesh stainless steel net dipped in toluene in a dark place for 48 hours. After the attached toluene is removed, the polymer is weighed. The polymer is dried again with a vacuum drier and the weight is measured. The swell degree and the gel content are calculated according to the following equations:

$$\text{Swell degree} = \frac{\text{(Weight after swelling)} - \text{(Weight after redrying)}}{\text{Weight after redrying}}$$

$$\text{Gel content (\%)} = \frac{\text{Weight after redrying}}{\text{Amount of sample collected}} \times 100$$

TABLE 4

|  | Backbone polymer No. | | | |
| --- | --- | --- | --- | --- |
|  | d-1 | d-2 | d-3 | d-4 |
| Swell degree | 10.1 | 10.4 | 10.3 | 10.5 |
| Gel content (%) | 93 | 92 | 94 | 93 |
| Tg | −54° C. | −39° C. | −66° C. | 20° C. |

Preparation of cross-linked polymer

Subsequently, the same glass reactor used in the preparation of the backbone polymer was charged with a mixture shown in Table 5, and the aqueous dispersion of the backbone polymer shown in Table 7. The polymerization was conducted under nitrogen atmosphere with stirring by adding 45 parts of a monomer mixture (d'-1) or (d'-2) shown in Table 6 containing 0.2 part of cumene hydroperoxide dropwise over 4 hours, and the polymerization was continued for one hour to complete the polymerization. All of the conversions are 95%.

To the obtained aqueous dispersion was added 1 part of 2,6-di-t-butyl-p-cresol, and was salted out and coagulated with calcium chloride, then granulated by heat. The dehydration, washing and drying were conducted to give fine particles of the cross-linked polymer (D-1), (D-2), (D-3), (D-4) or (D-5) shown in Table 7.

TABLE 5

| Aqueous dispersion of backbbone polymer (solid matter) | 55 parts |
| --- | --- |
| Deionized water (containing water derived from the aqueous dispersion) | 200 parts |
| Sodium formaldehyde sulfoxide (SFS) | 0.4 part |
| Ethylenediaminetetraacetic acid.2Na (EDTA-2Na) | 0.01 part |
| Ferrous sulfate | 0.005 part |

TABLE 6

|  | Mixture No. | |
| --- | --- | --- |
|  | d'-1 | d'-2 |
| Styrene | 40% | 0 |
| Methyl methacrylate | 60% | 70% |
| n-Butyl methacrylate | 0 | 30% |

TABLE 7

|  | Fine particles of the cross-linked polymer | | | | |
| --- | --- | --- | --- | --- | --- |
|  | D-1 | D-2 | D-3 | D-4 | D-5 |
| Backbone polymer | d-1 | d-1 | d-2 | d-3 | d-4 |
| Mixture | d'-1 | d'-2 | d'-2 | d'-2 | d'-2 |
| Average particle size (μm) | 0.3 | 0.3 | 0.3 | 0.3 | 0.3 |

REFERENCE EXAMPLE 4

Preparation of cross-linked polymer

A 2 l flask equipped with a stirrer, a nitrogen inlet tube, a temperature controler, a condenser and a decanter was charged with 134 parts of bis(hydroxyethyl) taurine, 130 parts of neopentyl glycol, 236 parts of azelaic acid, 186 parts of phtharic anhydride and 27 parts of xylene, and the temperature was elevated. The produced water was removed from the flask by azeotropic distillation with xylene.

The temperature reached to 190° C. after about 2 hour from the beginning of the reflux, the stirring and the dehydration were continued until the acid value of the carboxylic acid and(or) its derivative reached to 145, the resulting mixture was cooled down to 140° C. To the obtained mixture was added dropwise 314 parts of "Cardula E10" (glycidyl ester of versatic acid, commercially available from Shell CO.) over 30 minutes, then the mixture was stirred over 2 hours to complete the reaction.

The obtained polyester resin had an acid value of 59 and a hydroxyl value of 90.

A reactor was charged with 10 parts of the polyester resin and 0.75 part of dimethyl ethanol amine, and they were dissolved at 80° C. with stirring. To the solution was added 4.5 parts of azobiscyanovaleric acid dissolved in 45 parts of deionized water and 4.3 parts of dimethyl ethanol amine. Subsequently, a mixture of 70.7 parts of methyl methacrylate, 94.2 parts of n-butyl acrylate, 70.7 parts of styrene, 30 parts of 2-hydroxyethyl acrylate and 4.5 parts of ethylene glycol dimethacrylate was added dropwise over 60 minutes. After completing the addition, 1.5 parts of azobiscyanovaleric acid dissolved in 15 parts of deionized water and 1.4 parts of dimethylethanolamine was further added, and the stirring was continued at 80° C. for 60 minutes to give an emulsion having a non-volatile content of 45%, a pH of 7.2 and a viscosity of 92 cps (at 25° C.). The emulsion was spray dried to give particles (D-6) having a particle size of 8 μm.

EXAMPLES 1-5 AND COMPARATIVE EXAMPLES 1-6

A paint shaker was charged with 24 g of the resin solution (A-3), 24 g of "CR-90" (titanium dioxide commercially available from Ishihara Industry Kabushiki Kaisha) and 20 g of glass beads and the mixture was dispersed in the pain shaker for 3 hours, then 30 g of the resin solution (A-1) was added and the mixture was dispersed for 1 hour to give a white enamel (1) having a solid concentration of 60%.

Separatelly, 60 g of the resin solution (A-2), 24 g of "CR-90", 16 g of xylene and 20 g of glass beads were dispersed in the paint shaker for 3 hours to give a white enamel (2) having a solid concentration of 60%.

A curable composition (paint) was prepared by admixing the white enamel, the fine particles of the cross-linked polymer, dioctyl tin maleate and xylene in amounts shown in Table 8.

The dispersion stability and the sag resistance of the composition were measured and the film appearance, and the thickness and the gloss of the dry film were measured according to the methods as mentioned below. The results are shown in Table 8.

Also, as to a commercial acrylic melamine paint containing the fine particles of the cross-linked polymer or containing no fine particles, the same properties as above and the film thickness were measured. The results are shown in Table 8.

Dispersion stability of the cross-linked polymer fine particles

The composition containing the white enamel and the fine particles of the cross-linked polymer is allowed to stand at 50° C. for one month. The composition was observed with the naked eye.
◯: There is no cohesion.
X: The fine particles cohere together with each other.

Appearance

An aluminum plate is flow-coated with the composition, and the film surface is observed with the naked eye.
◯: The film has gloss.
(60°-gloss: not less than 80)
X: The film has no gloss
X (60°-gloss: not more than 60)

Sag resistance

After a line of the composition is drawn on a glass plate by using a sag tester, the plate is stood perpendicularly, a thickness of a sagging part is measured by the sag tester. The film thickness of 125 μm measured by the sag tester corresponds to the dry film thickness of about 30 μm, and the film thickness of 200 μm measured by the sag tester corresponds to the dry film thickness of about 50 μm.

Dry film thickness

A thickness of dry film on the aluminum plate is measured according to "Minitest 2000" [commercially available from ELEKTRO-PHYSIK KöLN (Germany)].

Gloss of the dry film

An aluminum plate is flow-coated with the composition, and the coating film is sintered at 140° C. for 30 minutes. The gloss (60°-gloss) of the film surface is measured according to JIS K 5400, using a GMX-202 color difference meter commercially available from Kabushiki Kaisha Murakami Shikisai Kenkyusho.

TABLE 8

| | Ex. No. | | | | | | |
| --- | --- | --- | --- | --- | --- | --- | --- |
| | 1 | 2 | 3 | 4 | 5 | 6 | Com. Ex. 1 |
| Composition | | | | | | | |
| Kind of the white enamel | White enamel (1) | White enamel (1) | White enamel (2) | White enamel (2) | White enamel (2) | White enamel (2) | White enamel (1) |
| (Amount) | (100 g) | (100 g) | (100 g) | (100 g) | (100 g) | (100 g) | (100 g) |
| Kind of the fine particles of cross-linked polymer | D-1 | D-2 | D-1 | D-2 | D-3 | D-4 | — |
| (Amount) | (1.8 g) | (1.8 g) | (1.8 g) | (1.8 g) | (1.8 g) | (1.8 g) | |
| Dioctyl tin maleate | 0.5 g | 0.5 g | 0.5 g | 0.5 g | 0.5 g | 0.5 g | 0.5 g |
| Xylene | 7 g | 7 g | 7 g | 7 g | 7 g | 7 g | 7 g |
| Physical property | | | | | | | |
| Dispersion stability of the fine particles of | ◯ | ◯ | ◯ | ◯ | ◯ | ◯ | — |

TABLE 8-continued

| cross-linked polymer | | | | | | | |
|---|---|---|---|---|---|---|---|
| Appearance | ○ | ○ | ○ | ○ | ○ | ○ | ○ |
| Sag resistance (μm) | 225 | 225 | 250 | 225 | 225 | 225 | 125 |
| Dry film | | | | | | | |
| Thickness (μm) | 70 | 70 | 70 | 70 | 70 | 70 | 25 |
| Gloss (%) | 95 | 95 | 95 | 95 | 95 | 94 | 95 |

| | | Ex. No. | | | | |
|---|---|---|---|---|---|---|
| | | Com. Ex. 2 | Com. Ex. 3 | Com. Ex. 4 | Com. Ex. 5 | Com. Ex. 6 |
| | Composition | | | | | |
| | Kind of the white enamel | White enamel (2) | White enamel (2) | White enamel (2) | Commerical acrylic melamine white enamel | Commerical acrylic melamine white enamel |
| | (Amount) | (100 g) | (100 g) | (100 g) | (100 g) | (100 g) |
| | Kind of the fine particles of cross-linked polymer | — | D-5 | D-6 | D-1 | — |
| | (Amount) | | (1.8 g) | (1.8 g) | (1.8 g) | |
| | Dioctyl tin maleate | 0.5 g | 0.5 g | 0.5 g | 0.5 g | — |
| | Xylene | 7 g | 7 g | 7 g | 7 g | 7 g |
| | Physical property | | | | | |
| | Dispersion stability of the fine particles of cross-linked polymer | — | ○ | ○ | ○ | — |
| | Appearance | ○ | ○ | ○ | ○ | ○ |
| | Sag resistance (μm) | 125 | 150 | 150 | 150 | 125 |
| | Dry film | | | | | |
| | Thickness (μm) | 25 | 35 | 35 | 45 | 25 |
| | Gloss (%) | 95 | 89 | 88 | 93 | 95 |

As shown in Table 8, when the fine particles of the cross-linked polymer which is prepared by conducting the polymerization in the presence of the polymer having Tg of not more than 10° C. are combined with the alkoxysilyl group-containing acrylic copolymer, the sag resistance of the alkoxysilyl group-containing acrylic polymer can be remarkably improved unexpectedly compared to the case where the fine particles are added to the acrylic melamine paint. As a result, the thickness of the coating film per one application can be made thick.

Using the curable composition of the present invention, a thickness of a coating film can be made 50 μm or more by one application without sagging, and the film is excellent in appearance, durability, chemical resistance, solvent resistance, and the like.

In addition to the ingredients used in the Examples, other ingredients can be used in the Examples as set forth in the specification to obtain substantially the same results.

What we claim is:

1. A curable composition comprising
(A) (a1) an alkoxysilyl group-containing acrylic copolymer having a group represented by the formula (I):

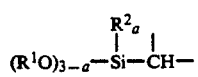

wherein
R$^1$ is an alkyl group having 1 to 10 carbon atoms,
R$^2$ is a hydrogen atom, or a monovalent hydrocarbon group having 1 to 10 carbon atoms selected from an alkyl group, an aryl group or an aralkyl group, and a is 0, 1 or 2,
(B) a curing catalyst,
(C) an organic solvent, and
(D) a cross-linked polymer in the state of fine particles: said cross-linked polymer (D) comprising:

(d1) a backbone polymer polymerized from (i) a monomer mixture of (i1) at least 50 parts by weight of at least one alkyl acrylate, wherein said alkyl group has 2 to 8 carbon atoms, (i2) 0.005 to 5 parts by weight of a cross-linking monomer, (i3) 0 to 49.95 parts by weight of other (meth)acrylic monomer and (i4) 0 to 20 parts by weight of a non-(meth)acrylic copolymerizable monomer, the amount of the monomer mixture (i) being 100 parts by weight, said backbone polymer (d1) having a glass transition temperature of not more than 10° C.; and (d2) a grafted phrase polymerized in the presence of said backbone polymer (d1) from (ii) a monomer mixture of (ii1) at least 40 parts by weight of at least one alkyl methacrylate, wherein said alkyl group has 1 to 4 carbon atoms, (ii2) 0 to 20 parts by weight of other (meth)acrylic comonomer and (ii3) 0 to 60 parts by weight of a non-(meth)acrylic copolymerizable comonomer, the amount of the monomer mixture (ii) being 100 parts by weight; said polymer (D) being insoluble but stably dispersible in the components (A), (B) and (C).

2. The composition of claim 1, wherein said component (A) further contains (a3) a hydroxyl group-containing acrylic resin.

3. The composition of claim 1, wherein said alkoxysilyl group-containing acrylic copolymer (a1) is a copolymer comprising 2 to 90% by weight of units of an alkoxylsilyl group-containing monomer having a polymerizable unsaturated double bond and an alkoxysilyl group in its molecule.

4. The composition of claim 2, wherein said hydroxyl group-containing acrylic resin (a3) has a hydroxyl value of 10 to 300 mgKOH/g and a number average molecular weight of 1,500 to 40,000.

5. The composition of claim 1, wherein said curing catalyst is an organotin compound, an acid phosphate, a product or mixture of an amine with an acid phosphate, a saturated or unsaturated polyvalent carboxylic acid or its anhydride, a reactive silicon compound, an organic titanate compound, an organic aluminum compound, an organic zirconium compound, or a mixture thereof.

6. The composition of claim 1, wherein said component (D) is fine particles having an average particle size of 0.01 to 10 μm.

7. The composition of claim 1, which contains further a pigment.

* * * * *